United States Patent [19]

Haroules et al.

[11] 3,737,905
[45] June 5, 1973

[54] METHOD AND APPARATUS FOR MEASURING SOLAR ACTIVITY AND ATMOSPHERIC RADIATION EFFECTS

[75] Inventors: George G. Haroules, Lexington; Wilfred E. Brown, North Acton, both of Mass.

[73] Assignee: The United States of America as represented by the Administrator of the National Aeronautics and Space Administration, Washington, D.C.

[22] Filed: Mar. 31, 1970

[21] Appl. No.: 24,155

[52] U.S. Cl. ...... 343/100 ME, 340/15.5 GC, 250/209
[51] Int. Cl. ................................................ H04b 7/00
[58] Field of Search ............................. 343/100 ME; 340/15.5 GC; 250/209

[56] References Cited

UNITED STATES PATENTS

| | | | |
|---|---|---|---|
| 3,430,047 | 2/1969 | Hurkamp | 250/209 |
| 3,129,330 | 4/1964 | Seling | 343/100 AD |
| 2,932,357 | 4/1960 | White | 340/15.5 GC |
| 3,564,420 | 2/1971 | Webb | 325/363 |

Primary Examiner—Carl D. Quarforth
Assistant Examiner—J. M. Potenza
Attorney—Herbert E. Farmer, John R. Manning and Garland T. McCoy

[57] ABSTRACT

This disclosure describes a radiometric measuring system for observing solar activity, atmospheric attenuation and atmospheric emission. Two highly directional microwave antennas are mounted side-by-side on an equatorial mount which tracks the sun. One antenna is aimed directly at the sun to provide a sun temperature and the other antenna is aimed at a slight angle to the sun antenna to provide a sky temperature reference. Signals from the two antennas are compared in a radiometric detecting system and provide information concerning solar activity and atmospheric attenuation and emission.

4 Claims, 4 Drawing Figures

PATENTED JUN 5 1973 3,737,905

INVENTORS
GEORGE G. HAROULES
WILFRED E. BROWN, III

BY

*Herbert E. Farmer*

ATTORNEYS

METHOD AND APPARATUS FOR MEASURING SOLAR ACTIVITY AND ATMOSPHERIC RADIATION EFFECTS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to the field of astrophysics. More particularly, the invention relates to techniques and instruments employed in astrophysics for measuring solar activity and atmospheric attenuation and emission by means of microwave radiometers. It is therefore a general object of the present invention to provide novel and improved methods and apparatus of such character.

2. Description of the Prior Art

In recent years there has been increased interest in studying the characteristics of both solar activity and the attenuation and radiation characteristics of the atmosphere at millimeter wavelengths. Though the determination of both solar and earth's atmospheric radiation characteristics at millimeter wavelengths might appear to involve quite dissimilar measurement objectives, the techniques commonly applied to both pursuits have a common denominator in the form of microwave and millimeter radiometric sensors.

For measurements of both solar radiation and earth's atmospheric attenuation the instrument usually employed is a radio telescope. Radio telescopes are highly directional antennas which are pointed at an object or region in space to be observed. These antennas detect microwave energy emitted by the observed body and power generated by the detected energy can be related to the temperature of the body being observed. The measurement of solar characteristics and earth's atmospheric radiation effects can thus be performed by employing microwave antennas that operate in the millimeter range of wavelengths.

If an antenna is pointed directly at the sun to observe its activity, the received radiation includes, not only the sun activity, but also the contaminating effects of earth's atmospheric attenuation and radiation. Variations in the detected temperatures may result from either solar activity or variations in the earth's atmospheric effects. In order to intelligently observe solar activity alone, it is necessary to compensate for, or subtract the atmospheric effects from the measured data.

Several methods for separating atmospheric effects from the solar activity measurements have been employed in the past. Systems providing these results have employed a single beam antenna which is mechanically moved between the sun and a reference direction in a short period of time compared with the anticipated time for significant signal events from the sun. The antenna is first pointed at the sun to pick up solar activity signals and then is pointed in a reference direction away from the sun to measure sky temperature. By pointing the antenna beam alternately toward and then away from the sun one is able to obtain two pieces of information which when appropriately combined subtract out atmospheric sky temperature effects to leave attenuation of the sun by the atmosphere.

In the mechanical deflection system, however, limitations are imposed by the rate at which the antenna system can be cycled between the two directions to obtain separate measurements of sun temperature and the sky noise temperature. Those limitations impede observation of critical radiation characteristics at the onset of a solar flare even where the antenna is cycled over a period of only a few seconds.

Another type of system is described by the present inventors in their article entitled "Relative Flux Densities of Radio Sources at a Frequency of 8 GHz" in THE ASTROPHYSICAL JOURNAL, Vol. 149, p. 711, September, 1967. This system employs the same principles as the mechanical cycling antenna system. The two temperatures from separate observations are obtained by electronically switching between two antenna feeds equally spaced above the bore axis of a parabolic antenna. While the cyclic rate can be substantially increased to detect rapidly varying radiation characteristics, such as those occurring at the onset of a solar flare, other disadvantages are attendant with the switching systems and isolation between the feeds. The selection and adjustment of the angle between the two observing directions (sun and sky) is not allowed by the paired feeds in the focal plane of the parabolic antenna. In addition, the antenna system must have a low noise characteristic. This is not possible due to aperture blockage associated with the use of multiple feed systems employing paired feeds.

It is accordingly an object of the present invention to provide methods and apparatus for utilizing radiometric instruments to measure solar activity and atmospheric attenuation and emission.

It is a further object of the present invention to disclose a microwave instrument which can measure solar activity and atmospheric attenuation and emission without compromising the performance of the radiometric instrument.

It is still a further object of the present invention to disclose a microwave solar activity measuring system which is flexible in the selection and adjustment of the angle between two observing directions.

It is still a further object of the present invention to disclose a solar activity measuring system that can be sequenced between two observing directions in a period of time which is short in comparison to the time for significant signal events.

It is still a further object of the present invention to disclose a dual microwave antenna system that can be rapidly switched between two observing directions without introducing contaminating effects of aperture blockage associated with multiple feed systems.

It is still a further object of the present invention to disclose a microwave system which allows simple operation and data analysis.

SUMMARY OF THE INVENTION

The foregoing and other objects of the present invention are achieved by a novel and improved technique and measurement system for detecting solar activity and atmospheric attenuation and emission. The invention encompasses both the apparatus employed and the various methods in which the apparatus is operated to accomplish different measurement functions.

In accordance with the present invention two microwave antennas, or radio telescopes, are supported on an equatorial, or polar, stand which is driven in the hour angle coordinate by means of a synchronous clock. One of the antennas, hereinafter referred to as the sun antenna, is aimed directly at the sun. The drive mechanism for the mount causes the sun antenna to track the sun. The other antenna, hereinafter referred to as the sky antenna, is aimed at the sky along an axis which deviates from the boresight axis of the sun antenna by a small amount. The amount of deviation between the boresight directions of the two antennas is just adequate to assure that the sidelobe contribution of the sun in the sky antenna is at least 5 db below the dynamic range of atmospheric attenuation measurement capability. Aside from the slightly different boresight directions, the two antennas are substantially identical and have highly directional sensitivity.

The remainder of the radiometric system of the present invention is composed of apparatus for detecting and processing the signals sensed by the antennas. In this respect, while it is understood that the antennas detect microwave energy, the signals processed by the system are referred to as temperatures because of the relationship between the microwave energy from the observed body and the characteristic temperature of the body.

The detection circuitry of the radiometer first receives the radio frequency temperature signals from the antennas through a modulator driven by a reference generator. The temperature difference signals are processed through a linear channel and a logarithmic channel. A permanent record of the output of each channel is then made by means of a dual channel strip-chart recorder or a magnetic tape recorder.

In the logarithmic channel, the temperature signals are processed through a logarithmic video amplifier. In order to produce a readily usable output, the recorded signal represents the solar activity and atmospheric attenuation and emission characteristics in decibels. The calibration of the logarithmic channel is selected so that the 0 db level corresponds to the quiet sun temperature in the absence of atmospheric attenuation. With this reference, steady state signals at minus values on the recorder represent atmospheric emission and attenuation and fluctuations above the steady state readings indicate solar activity, such as solar flares.

The linear channel amplifies the temperature difference signals and consequently provides measurements of small changes in solar radiation characteristics on clear days. The linear measurement is also useful in indicating high values of atmospheric attenuation which may exceed the logarithmic scale. In an absolute temperature mode, the linear amplifier is used to make sky temperature measurements at night.

The measuring system also includes its own calibration equipment for calibrating the logarithmic and linear channels.

BRIEF DESCRIPTION OF THE DRAWINGS

The novel radiometric measuring system of the present invention and its various objects and advantages may be better understood by reference to the following drawings in which like elements are given like numerals throughout the several figures.

DESCRIPTION OF THE PREFERRED EMBODIMENTS

Figure 1:
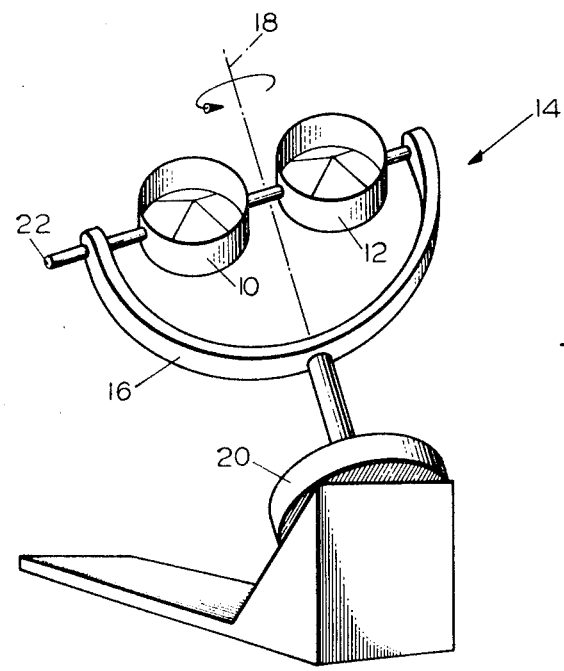
FIG. 1 is a view of the dual antenna system supported on an equatorial mount.

With reference to FIG. 1, two microwave antennas, 10 and 12, or radio telescopes are shown supported side-by-side on a polar, or equatorial, mount generally designated 14. The mount 14 includes a yoke 16 which is rotated about the hour axis 18 by a drive motor 20. The drive motor 20 is controlled by a synchronous clock (not shown) which causes the yoke 16 and the two antennas 10 and 12 mounted on the yoke to rotate in synchronism with the rotation of the earth about its polar axis. The hour axis 18 is slanted at an angle to the local horizontal so that it is parallel to the polar axis of the earth. The antenna 12 is the sun antenna and, therefore, is pointed toward the sun. The rotation of the yoke 16 about the hour axis 18 by means of the synchronously controlled motor 20 causes the sun antenna 12 to track the sun from sunrise to sunset. Adjustments of the two antennas 10 and 12 about the declination axis 22 are necessary throughout the year due to the seasonal variations in the sun's path across the sky. It may also be desirable to account for the diurnal deviations of the sun about the declination axis by boresighting the antennas half-way between the respective declination angles at sunrise and sunset. In this manner, the sun will be located as nearly as possible in the field of view of the sun antenna 12 for a greater portion of the day and will be centered within the field of view at the zenith. The diurnal deviations in the hour azimuth are generally smaller and less significant. Therefore, the difficulty of modulating the synchronous drive can be avoided without greatly sacrificing the accuracy of the measurements.

While the sun antenna 12 is pointed directly at the sun, the sky antenna 10, which provides the sky reference temperature is aimed at a slight angle to the bore axis of the sun antenna 12. The deviation between the two boresight directions of the antennas 10 and 12 must be sufficient to assure that the sidelobe contribution of the sun in the sky antenna 10 is at least 5 db below the dynamic range of atmospheric attenuation measurement capability. Since the sky antenna 10 is intended to provide a sky temperature reference and is supposed to correspond exactly with the sky noise detected by the sun antenna 12, the deviation of the boresight directions of the two antennas should be made as small as possible to minimize the effect of sky temperature gradients, particularly gradients which are sensed by the dual antenna system near sunrise and sunset. In general, the deviation angle of the two antennas is in the hour azimuth at higher latitudes. For observation sites closer to the equator, angular displacement of the two beams in the declination coordinate is more appropriate. For latitudes near the equator, the declination angle separation provides almost equivalent elevation angles for the two antennas at sunrise and sunset. In addition, the high elevation angle of the sun at local meridian crossing is less susceptible to differential path links through the atmosphere. At the higher latitudes, the effect of these considerations is reversed.

Figure 2:
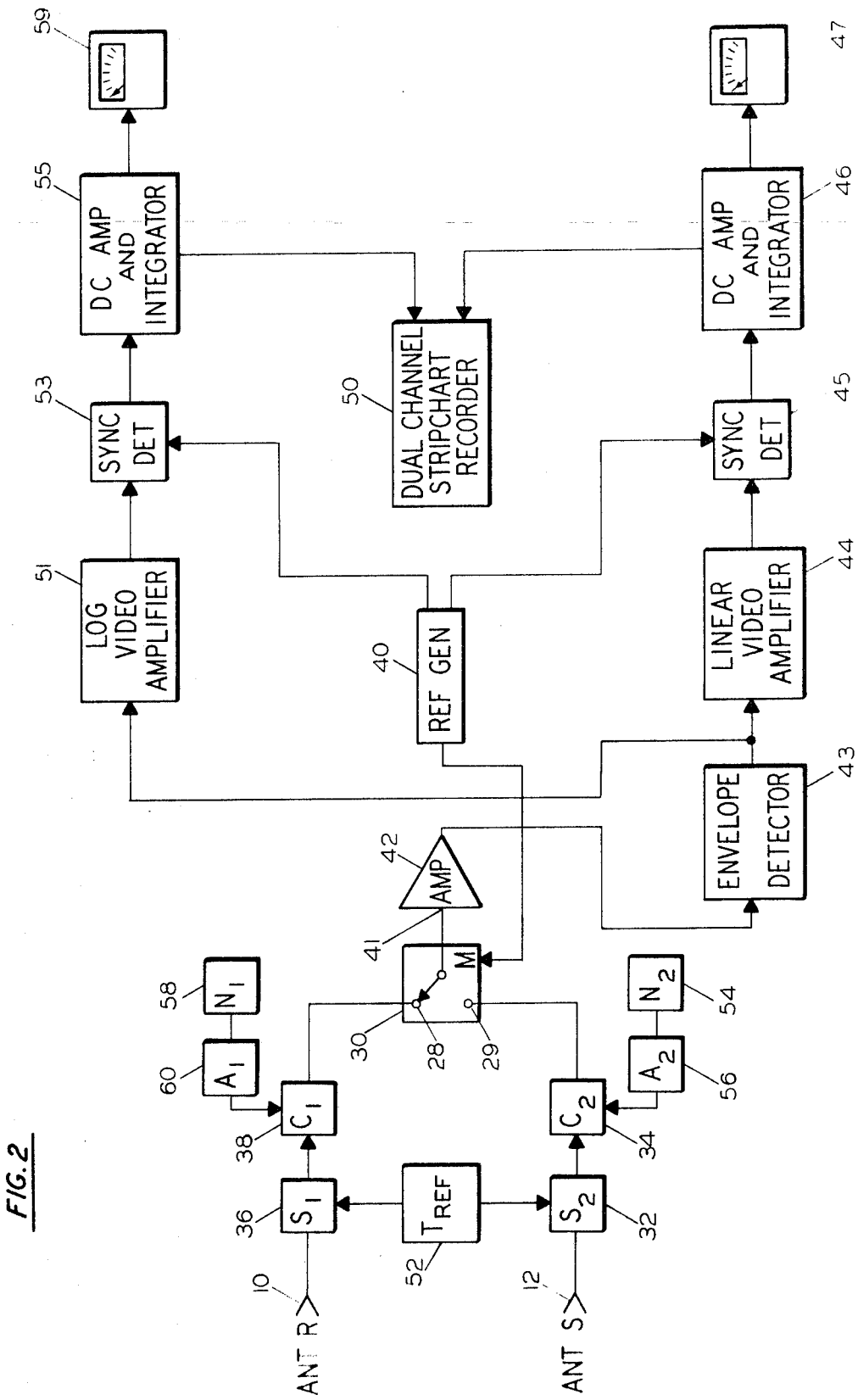
FIG. 2 is a block diagram of the radiometric measuring system.

FIG. 2 is a block diagram depicting the signal processing components of the radiometric measurement system of the disclosed embodiment of the present invention. It is a principal function of the signal processing components in one mode of operation to subtract the sky temperature as measured by antenna 10 from the sun temperature as sensed by antenna 12 and then compare the resulting difference temperature with a reference representing the sun temperature in a quiet state in the absence of atmospheric attenuation. The generally steady state deviation of the resulting measurement from the reference is an indication of the amount of atmospheric attenuation. Any fluctuations from the steady state value are a measure of solar activity such as that caused by a solar flare.

It is also possible to operate the measurement system in an absolute temperature mode in which the absolute sky temperature can be measured.

To these ends, the temperature signals, which are in fact radio frequency waves picked up by the two antennas, are transmitted through identical rf transmission line paths to a ferrite modulator 30. The sun temperature signal plus sky noise temperature from antenna 12 are transmitted through a waveguide switch 32 and a coupler 34 before it reaches the modulator 30. In a similar manner, the sky reference temperature from antenna 10 is transmitted through an identical path including waveguide switch 36 and coupler 38. It is important that the rf transmission line losses and the corresponding noise radiation contributions be as similar as possible in the two paths between the antennas and the modulator 30.

Prior to considering a detailed description of the rf circuitry portion of FIG. 1 it is well to consider the conventional operational aspects of the signal processing receiver circuitry. An rf modulator 30 at the receiver input 41 acts as a single-pole, double throw switch. The modulator 30 provides an amplitude modulated noise signal input to the radiometer which is proportional to the temperature difference between the noise powers presented to the input port 29 and comparison port 28 of the modulator. The modulation component is amplified at the rf frequency by an rf amplifier 42, detected by an envelope detector 43 and is then further amplified by a narrow band linear video amplifier 44 at the modulation frequency. The signal is then synchronously detected by means of a reference generator 40 and a synchronous phase detector 45 to provide to an indicator unit 47 and dual channel strip chart recorder 50 a DC voltage proportional to the input temperature difference at the modulator ports 28 and 29. The average value of the amplitude modulated signal from the synchronous detector 45 is extracted by the DC amplifier and integrator 46. Square law detector response is assured by maintaining a relatively low noise power signal level relative to the receiver noise level. The output of the envelope detector 43 is then amplified by the logarithmic video operational amplifier 51 such that the output of the amplifier is the logarithm of the input. The signal is then fed through a synchronous detector 53, and DC amplifier and integrator 55 and is displayed by an indicator unit 59 which reads in db logarithmically. These detecting portions of the logarithmic channel are identical to the detecting portions of the linear channel.

The required radiometric sensitivity of the system is determined when making atmospheric attenuation measurements by sky noise fluctuation level. With present day mixer preamplifiers, a sensitivity of 0.25°K rms can easily be achieved with a post detection integration time constant of approximately one second.

In order to produce meaningful and readily usable output data at the dual channel recorder 50, the system must be calibrated for the different modes of operation. Accordingly, the radiometer includes several different calibrating devices for setting the balance and gain of the logarithmic and linear video channels.

In order to correct for any difference in the transmission line losses from the two antennas, a reference temperature load 52 is connected to each of the transmission lines by means of switches 32 and 36 respectively. The reference temperature load 52 is formed by dual resistive loads in a common temperature controlled environmental chamber. With the transmission lines connected by the switches 32 and 36 to the load 52, antennas 10 and 12 are disconnected. The detecting circuitry is turned on and the gains of the linear video channel are adjusted and balanced to set the output of the linear channel at the zero signal level on the stripchart recorder. When the linear channel has been balanced, the zero level on the linear scale will correspond to zero atmospheric attenuation. At higher attenuations ranging upwardly towards infinity, the logarithmic channel goes off scale and the linear channel may be referred to. The linear channel may also provide measurements of small changes in solar radiation characteristics on clear days. Major solar flares, which on occasion provide a five- or possibly tenfold increase in solar flux intensity relative to the quiet sun level, are measured on the log scale because the linear channel will be driven off scale.

The logarithmic channel, therefore, has the principal function of presenting information concerning large scale solar activity such as that occasioned by major solar flares. Since the recorded signal from the logarithmic amplifier 51 is in decibels it is necessary to balance the logarithmic channel for a zero reading at a selected reference level. The reference level for measuring solar activity and atmospheric attenuation is the quiet sun temperature in the absence of atmospheric attenuation. This reference is obtained by connecting each of the rf transmission lines through waveguide switches 32 and 36 to the temperature reference 52. The noise generator 58 in one embodiment is a gas discharge noise generator and the signal produced by the generator is fed through an attenuator 60 to coupler 38. The adjustment of the attenuator 60 requires the accumulation of considerable observational data, particularly under clear weather conditions, in order to arrive at the desired operational value that represents sun temperature in a quiescent state in the absence of atmospheric interference or noise. With balanced temperature signals derived from the temperature reference 52 being supplied through each of the switches 32 and 36 and with the calibrated quiescent sun temperature from noise generator 58 and attenuator 60 being added to the reference temperature transmission line through coupler 38 the logarithmic video amplifier 51 can be adjusted to position the stylus of the stripchart recorder corresponding to infinite attenuation and the stylus of the linear amplifier is adjusted to read full scale. All readings taken subsequent to this calibration are then referenced to the sun temperature in its quiescent state in the absence of atmospheric noise. This quiescent condition, therefore, is the 0-db level on the recorder. All atmospheric attenuation signals and major solar flare activity measurements are then made by the log video channel.

The linear channel provides the rf zero or input balance of the radiometer. This channel allows measurements of atmospheric emission and allows full scale calibration.

The operation of the radiometric measuring system in the mode for recording solar activity and atmospheric attenuation is accomplished relatively easily. The antenna mount is positioned in hour angle and declination angle to provide a maximum response from the sun antenna 12. The mount is then placed in an automatic synchronous drive mode in the hour angle coordinate for automatic tracking of the sun from sunrise to sunset. The recorder produces a trace proportional to the signal from each channel. The scale in the logarithmic channel would extend between +10db and −30 db. The positive portion of the scale is sufficient to measure major solar flares which could drive the linear channel off scale. The 0 db to −30 db portion of the log video scale is used primarily for the measurement of atmospheric attenuation.

Figure 3:
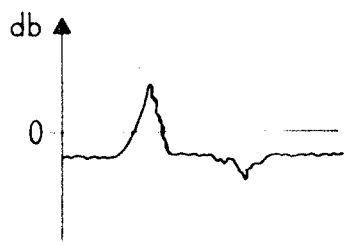
FIG. 3 depicts the logarithmic traces produced by the measurement system on the dual channel recorder.

FIG. 3 depicts a typical trace produced by the logarithmic channel. It will be noted that the logarithmic trace is measured in db and the steady state valve of the trace lies somewhat below the 0-db level. The difference between the 0-db level and the steady state value represents the amount of atmospheric attenuation present at the time the trace was made. The perturbations above the steady state value represent solar activity such as major solar flares detected by the sun temperature antenna 12. It will be understood that had there been no atmospheric attenuation or sky emission temperature, in other words very clear weather and sky, the steady state value would closely approximate the 0-db level and the solar activity would be represented by perturbations above the 0-db level. Accordingly, the 0-db level does not represent the maximum sun temperature but instead the temperature of the sun in a quiescent state in the absence of atmospheric effects.

Figure 4:
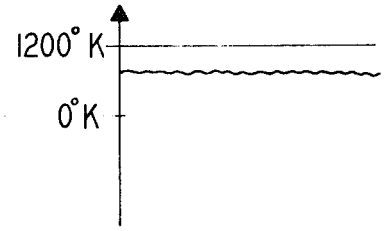
FIG. 4 depicts the linear traces produced by the measurement system on the dual channel recorder.

FIG. 4 represents a trace produced by the linear video channel when there is very little solar activity. The zero reference is calibrated from a noise source which has a noise temperature close to absolute zero and the full scale value is approximately 1,200°K for the quiescent sun temperature. Since major solar activity may be five or ten times greater than the signal level in the quiescent state, the linear channel may be driven off scale if such activities are recorded. However, for small changes in solar radiation on clear days the linear channel can be employed.

The radiometric measuring system can also be operated in an absolute temperature mode. In this mode it is possible to measure sky temperature at night with the transmission line of the sun antenna 12 connected through switch 32 to antenna 12. It is necessary to introduce a calibrated noise when the system is employed in the absolute temperature mode. This noise is produced by noise generator 54 and is introduced through attenuator 56 into the rf transmission line at coupler 34. For a more detailed explanation of an absolute power measurement system, reference can be made to U. S. Pat. application No. 686,248 filed November, 28, 1967.

It will therefore be seen that the radiometric system produces outputs in readily usable form for determining solar activity and atmospheric attenuation and emission effects. Further data analysis of the atmospheric attenuation characteristics can easily be made by magnetic tape recordings of the analog signals or by tape recording responses of threshold detectors preset at specific db levels. A time channel may advantageously be employed to introduce data and hour information. The elevation angle at the time of observation can easily be introduced in a computer analysis program by means of solar ephemeral data for position coordinates of the observing site.

While the invention has been described in particular embodiments, it will be understood that various modifications and substitutions can be made to the disclosed system without departing from the spirit of the invention. It may be desirable to duplicate the antenna systems so that more than one frequency of observation can be used simultaneously. This may be accomplished either by adding a second set of antennas for the new frequency to the present mount or by providing a separate mount for the other set of antennas.

In selecting the antennas, important considerations are the sidelobe level and particularly the backlobe pattern which intercepts the earth terrain. The backlobe response may act as a variable component at the radiometer output and should be compensated for to obtain accurate readings. The amplitude of the backlobe contribution would be determined by the backlobe power pattern and the spacial distribution of terrain emissivity as the function of the "look" angle of the antenna. If a parabolic antenna is used, a cylindrical tunnel extending beyond the focal plane is required to reduce the level of backlobe contributions associated with the prime pattern spillover near the lip of the reflector.

It is also contemplated that the design of the antenna should minimize the effect of precipitation on the reflecting surfaces and the feed element. The use of cornucopia or folded horn antennas for the most part eliminates precipitation effects. A small splashplate located directly behind the feed is also very effective in diverting water droplets away from the feed system even under the most adverse conditions of heavy rainfall.

It will thus be understood that the radiometric system can measure both solar activity and atmospheric attenuation and emission without compromising the performance of the radiometric instrument. By the use of two separate antennas having slightly different look angles, greater flexibility in selecting and adjusting the angle between the two observing directions is provided. There is also greater opportunity to use a variety of low noise antennas without introducing the contaminating effects of aperture blockage associated with multiple feed systems. In addition, the instrument may be used in microwave or millimeter wavelengths and is not frequency dependent.

What is claimed is:

1. Apparatus for measuring solar activity and atmospheric radiation effects from electromagnetic radiation comprising:

a movable sun temperature antenna directionally sensitive to electromagnetic radiation and having a known axis of radiation sensitivity;

a sky temperature antenna directionally sensitive to electromagnetic radiation, mounted adjacent to the sun temperature antenna and coupled with the sun antenna for tracking the sun therewith, the sky temperature antenna having an axis of radiation sensitivity positioned at a selected angle to the known axis of the sun antenna;

comparison means connected to the sun temperature antenna and the sky temperature antenna for determining the difference in the electromagnetic radiation temperature signals sensed by the two antennas; and detecting means connected with the comparison means for indicating the difference in the electromagnetic radiation temperature signals, said detecting means including calibration means comprising means for generating a signal corresponding to a known reference and means for generating a signal corresponding to a known sun temperature.

2. The measuring apparatus of claim 1 wherein the two antennas are microwave antennas including radio frequency transmission lines connected to the respective antennas for transmitting the radio frequency temperature signals sensed by the antennas;

said calibration means being connected to each of the radio frequency transmission lines for balancing the measuring apparatus, and including switches in each transmission line, said known reference signal generating means comprising a common reference temperature signal source connected through the switches to each of the transmission lines and said known sun temperature signal generating means comprising a calibrated reference providing a temperature signal equal to quiescent sun temperature in the absence of atmospheric attenuation.

3. The method of measuring solar activity and atmospheric radiation effects comprising:

sensing a sun temperature by means of electromagnetic radiation along a first observation direction toward the sun;

simultaneously sensing a sky reference temperature by means of electromagnetic radiation along a second observation direction toward the sky, the first and second observation directions having angular separation such that the angle between the observational directions provides substantially the same electromagnetic contributions from the sky in each direction and a limited electromagnetic radiation contribution from the sun in the second observational direction; and the sensing along the first and second observational axes is performed continuously while the first observational axis is tracking the sun; and comparing the two temperature signals to determine the difference in the sensed temperature signals; and using calibration means to reference the difference in the sensed temperature signals to a known reference level and a known sun temperature.

4. The measuring method of claim 3 wherein:

the recording of the difference in the sensed temperature signals references the known reference level and the difference to the sun temperature in the quiescent state in the absence of atmospheric attenuation.

* * * * *